US012656370B2

(12) United States Patent
Wang

(10) Patent No.: US 12,656,370 B2
(45) Date of Patent: Jun. 16, 2026

(54) MOTION TIME CALCULATION METHOD, DEVICE AND APPARATUS, AND COMPUTER-READABLE STORAGE MEDIUM

(71) Applicant: GOERTEK INC., Weifang (CN)

(72) Inventor: Mingming Wang, Weifang (CN)

(73) Assignee: GOERTEK INC., Weifang (CN)

( * ) Notice: Subject to any disclaimer, the term of this patent is extended or adjusted under 35 U.S.C. 154(b) by 451 days.

(21) Appl. No.: 18/552,449

(22) PCT Filed: Oct. 19, 2021

(86) PCT No.: PCT/CN2021/124595
§ 371 (c)(1),
(2) Date: Sep. 26, 2023

(87) PCT Pub. No.: WO2022/198991
PCT Pub. Date: Sep. 29, 2022

(65) Prior Publication Data
US 2024/0175894 A1 May 30, 2024

(30) Foreign Application Priority Data

Mar. 26, 2021 (CN) .......................... 202110329829.6

(51) Int. Cl.
*G01P 15/18* (2013.01)
(52) U.S. Cl.
CPC .................................... *G01P 15/18* (2013.01)
(58) Field of Classification Search
CPC ......... G01P 15/18; G01C 21/16; G01C 19/00; G01N 33/00
See application file for complete search history.

(56) References Cited

U.S. PATENT DOCUMENTS 9,009,516 B1 * 4/2015 Gabayan ................. G06F 1/163
713/323
9,037,199 B1 * 5/2015 Stogaitis ............... G06F 1/1626
455/574
(Continued)

FOREIGN PATENT DOCUMENTS

CN 104406604 A 3/2015
CN 106388771 A 2/2017
(Continued)

OTHER PUBLICATIONS

International Search Report from International Application No. PCT/CN2021/124595 mailed Jan. 19, 2022.

*Primary Examiner* — David J Bolduc
(74) *Attorney, Agent, or Firm* — Shih IP Law Group, PLLC

(57) ABSTRACT

A motion time calculation method, device and apparatus and a computer-readable storage medium are disclosed, the motion time calculation method comprises: acquiring a motion flag corresponding to a first preset time period, wherein the motion flag comprises a first motion flag and a second motion flag; if motion flags corresponding to two consecutive first preset time periods are first motion flags, entering a motion mode; after entering the motion mode, if motion flags corresponding to three consecutive first preset time periods are second motion flags, exiting the motion mode; and counting a time from entering the motion mode to exiting the motion mode into a motion time. Thus, more accurate calculation of the motion time is achieved.

10 Claims, 3 Drawing Sheets

(56)          References Cited

U.S. PATENT DOCUMENTS

| | | | | | |
|---|---|---|---|---|---|
| 9,684,353 | B2 * | 6/2017 | Xu | .................. | G06F 1/3206 |
| 10,979,873 | B2 * | 4/2021 | Uchiyama | ............ | H04L 67/125 |
| 11,029,743 | B2 * | 6/2021 | Fukumoto | ............ | H04W 4/027 |
| 2008/0140338 | A1 * | 6/2008 | No | .................. | G06F 1/3206 |
| | | | | | 702/160 |
| 2008/0234935 | A1 * | 9/2008 | Wolf | ................ | G01C 19/02 |
| | | | | | 701/472 |
| 2012/0059623 | A1 * | 3/2012 | Sambongi | ........... | G01C 21/005 |
| | | | | | 702/150 |
| 2012/0278023 | A1 | 11/2012 | Han | | |
| 2014/0081156 | A1 * | 3/2014 | Ohsawa | .............. | A61B 5/721 |
| | | | | | 600/483 |
| 2014/0236530 | A1 * | 8/2014 | Greene | .............. | A61B 5/1118 |
| | | | | | 702/141 |
| 2016/0054129 | A1 | 2/2016 | Manabe | | |
| 2016/0101319 | A1 * | 4/2016 | Tanabe | .............. | G01C 22/006 |
| | | | | | 434/255 |
| 2016/0143544 | A1 | 5/2016 | Tanaka | | |
| 2016/0245924 | A1 * | 8/2016 | Tanabe | .................. | G01P 15/18 |
| 2017/0343573 | A1 * | 11/2017 | Lai | ........................ | G01V 7/02 |
| 2018/0213873 | A1 * | 8/2018 | Brice | .................. | A42B 3/046 |
| 2019/0030396 | A1 | 1/2019 | Karc | | |
| 2019/0293451 | A1 * | 9/2019 | Cook | .................. | G01C 25/00 |
| 2020/0050955 | A1 | 2/2020 | Chiang et al. | | |
| 2021/0053232 | A1 * | 2/2021 | Watanabe | ......... | G01C 21/1656 |
| 2021/0302604 | A1 * | 9/2021 | Ueda | .................. | G01V 1/18 |

FOREIGN PATENT DOCUMENTS

| | | | |
|---|---|---|---|
| CN | 106767794 | A | 5/2017 |
| CN | 108836343 | A | 11/2018 |
| CN | 109582713 | A | 4/2019 |
| CN | 110263870 | A | 9/2019 |
| CN | 110584675 | A | 12/2019 |
| CN | 110674801 | A | 1/2020 |
| CN | 111879333 | A | 11/2020 |
| CN | 112206480 | A | 1/2021 |
| CN | 113074724 | A | 7/2021 |

* cited by examiner

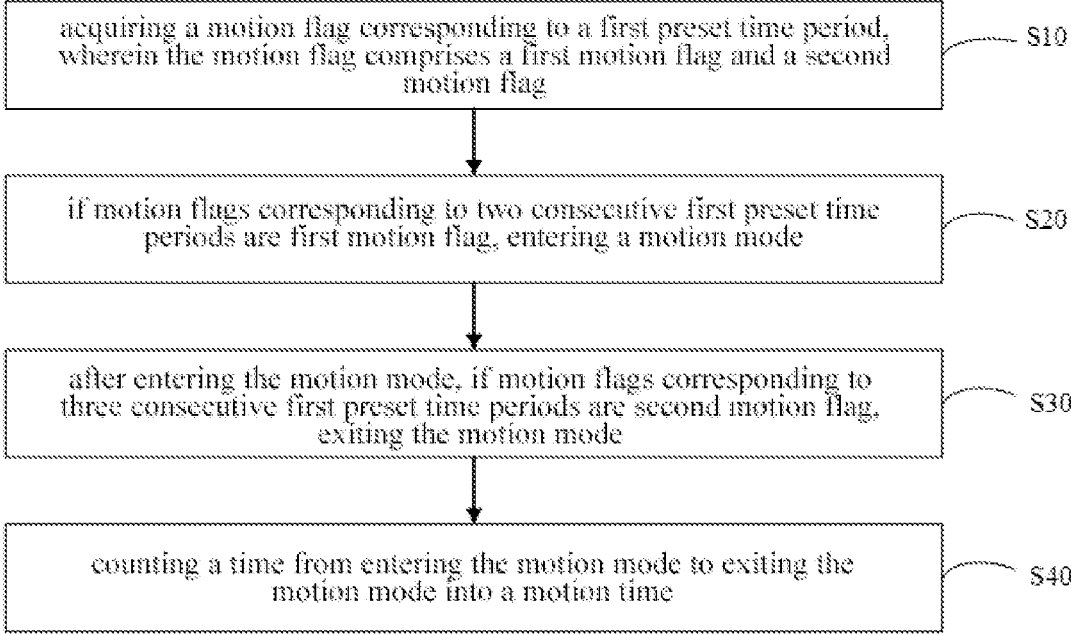

acquiring a motion flag corresponding to a first preset time period, wherein the motion flag comprises a first motion flag and a second motion flag — S10 if motion flags corresponding to two consecutive first preset time periods are first motion flag, entering a motion mode — S20 after entering the motion mode, if motion flags corresponding to three consecutive first preset time periods are second motion flag, exiting the motion mode — S30 counting a time from entering the motion mode to exiting the motion mode into a motion time — S40

Fig. 2

MOTION TIME CALCULATION METHOD, DEVICE AND APPARATUS, AND COMPUTER-READABLE STORAGE MEDIUM

The disclosure claims a priority of the Chinese Patent Application No. 202110329829.6, titled "motion time calculation method, device and apparatus, and computer-readable storage medium" filed in China Patent Office on Mar. 26, 2021, the entire contents of which are incorporated into the disclosure by reference.

TECHNICAL FIELD

The disclosure relates to a technical field of motion detection, and more particularly, relates to a motion time calculation method, a motion time calculation device, a motion time calculation apparatus, and a computer-readable storage medium.

BACKGROUND ART

Most of the existing intelligent wearable apparatus can record the number of walking steps of users and calories consumed by users, and it also support various motion modes, such as fitness, riding, swimming, etc. At present, the riding algorithm used by the intelligent wearable apparatus is generally to collect acceleration values in three axes by a three-axis accelerometer to calculate the angle and the amplitude, and to set conditions for determining the riding mode and for calculating the riding time. The disadvantage of this method is that, if there is an interference action on hands of the user during the riding process to cause the calculated angle not conform to the conventional riding action, the user may be incorrectly determined not to be in the riding state, resulting in incorrect determination of the riding state and incorrect calculation of the riding time.

SUMMARY

A main purpose of the disclosure is to provide a motion time calculation method, a motion time calculation device, a motion time calculation apparatus, and a computer-readable storage medium, which aims to solve a technical problem that the motion algorithm used by the existing intelligent wearable apparatus may cause incorrect determination to result in incorrect determination of the motion mode and incorrect calculation of the motion time.

In addition, in order to achieve the above purpose, the disclosure further provides a motion time calculation method, which comprises the following steps:

acquiring a motion flag corresponding to a first preset time period, wherein the motion flag comprises a first motion flag and a second motion flag;

if motion flags corresponding to two consecutive first preset time periods are first motion flags, entering a motion mode;

after entering the motion mode, if motion flags corresponding to three consecutive first preset time periods are second motion flags, exiting the motion mode; and counting a time from entering the motion mode to exiting the motion mode into a motion time.

Optionally, the step of acquiring a motion flag corresponding to a first preset time period, wherein the motion flag comprises a first motion flag and a second motion flag, comprises:

acquiring a resultant acceleration of a first axis, a second axis and a third axis by a three-axis accelerometer, and calculating resultant acceleration energy corresponding to a second preset time period and calculating the number of peaks of the resultant acceleration based on a sampling frequency and the resultant acceleration, wherein the second preset time period belongs to the first preset time period;

calculating an acceleration energy ratio corresponding to the second preset time period based on the resultant acceleration energy;

if the resultant acceleration energy belongs to a first preset section, a maximum value of the acceleration energy ratio is less than a first preset threshold, and the number of the peaks of the resultant acceleration is greater than a second preset threshold, determining a motion element corresponding to the second preset time period as a first motion element; and if the number of the first motion element corresponding to the first preset time period is greater than a third preset threshold, determining the motion flag corresponding to the first preset time period as the first motion flag.

Optionally, the step of calculating resultant acceleration energy corresponding to a second preset time period based on a sampling frequency and the resultant acceleration comprises:

determining a sampling time point corresponding to the second preset time period based on the sampling frequency and the second preset time period, wherein the number of sampling time points is greater than one, and the sampling time points correspond to resultant accelerations one by one;

calculating an average value of the resultant accelerations; and calculating an absolute difference value between each of the resultant accelerations and the average value, and taking a sum of absolute difference values as the resultant acceleration energy.

Optionally, the step of calculating the number of peaks of the resultant acceleration comprises:

acquiring a target waveform graph containing all of the resultant accelerations based on all of the resultant accelerations acquired in the second preset time period, and taking a sum of the number of peaks and valleys in the target waveform graph as the number of the peaks of the resultant accelerations.

Optionally, the step of calculating an acceleration energy ratio corresponding to the second preset time period based on the resultant acceleration energy comprises:

calculating a first acceleration energy corresponding to the first axis, a second acceleration energy corresponding to the second axis, and a third acceleration energy corresponding to the third axis in the second preset time period;

calculating a first ratio between the first acceleration energy and the second acceleration energy, a second ratio between the first acceleration energy and the third acceleration energy and a third ratio between the second acceleration energy and the third acceleration energy, and taking the first ratio, the second ratio and the third ratio as acceleration energy ratios corresponding to the second preset time period.

Optionally, after the step of if the resultant acceleration energy belongs to a first preset section, a maximum value of the acceleration energy ratio is less than a first preset threshold, and the number of the peaks of the resultant acceleration is greater than a second preset threshold, determining a motion element corresponding to the second preset time period as a first motion element, the method further comprises:

if the number of the first motion element corresponding to the first preset time period is less than or equal to the third preset threshold, determining the motion flag corresponding to the first preset time period as the second motion flag.

Optionally, the step of counting a time from entering the motion mode to exiting the motion mode into a motion time comprises:

acquiring the number of a target of the first preset time period from entering the motion mode to exiting the motion mode, and taking a product of the number of the target and the first preset time period as the motion time.

In addition, in order to achieve the above purpose, the disclosure further provides a motion time calculation device comprising:

a motion flag acquisition module, configured to acquire a motion flag corresponding to a first preset time period, wherein the motion flag comprises a first motion flag and a second motion flag;

a motion mode entering module, configured to drive the device to enter a motion mode if motion flags corresponding to two consecutive first preset time periods are first motion flags;

a motion mode exiting module, configured to drive the device to exit the motion mode if motion flags corresponding to three consecutive first preset time periods are second motion flags after entering the motion mode; and a motion time calculation module, configured to count a time from entering the motion mode to exiting the motion mode into a motion time.

In addition, in order to achieve the above purpose, the application further provides a motion time calculation apparatus. The motion time calculation apparatus comprises a memory, a processor, and a motion time calculation program stored in the memory and executable by the processor, and steps of the motion time calculation method as described above are implemented when the motion time calculation program is executed by the processor.

In addition, in order to achieve the above purposes, the disclosure further provides a computer-readable storage medium, a motion time calculation program is stored in the computer-readable storage medium, and steps of the motion time calculation method as described above are implemented when the motion time calculation program is executed by the processor.

The embodiment of the disclosure provides a motion time calculation method, a motion time calculation device, a motion time calculation apparatus and a computer-readable storage medium. In the embodiment of the disclosure, the motion flag corresponding to a first preset time period is acquired, wherein the motion flag comprises a first motion flag and a second motion flag, so that motion flags corresponding to consecutive first preset time periods can be determined, and if the motion flags corresponding to two consecutive first preset time periods are first motion flags, a motion mode is entered; after entering the motion mode, if the motion flags corresponding to three consecutive first preset time periods are second motion flags, the motion mode is exited; and a time from entering the motion mode to exiting the motion mode is counted into a motion time, to ultimately achieve a more accurate motion time calculation.

BRIEF DESCRIPTION OF DRAWINGS

In order to more clearly explain the technical solutions in the embodiments of the disclosure or the prior art, the drawings needed to be used in the descriptions of the embodiments or the prior art will be briefly introduced in the following. It is obvious that the drawings in the following descriptions are only part of the drawings of the disclosure, and for those skilled in the art, other drawings can also be obtained according to the provided drawings without any inventiveness work.

FIG. 2 is a schematic diagram of a flowchart of a first embodiment of the motion time calculation method of the disclosure;

DETAILED DESCRIPTIONS

The technical solution in the embodiments of the disclosure will be described in combination with the drawings in the embodiments of the disclosure in the following. It is obvious that the embodiments described in the following descriptions are only part of the embodiments, but are not all of the embodiments of the disclosure. All other embodiments obtained by those skilled in the art based on the embodiments in the disclosure without inventiveness work fall within the protection scope of the disclosure.

It should be understood that the specific embodiments described herein are only used to explain the disclosure but are not intended to limit the disclosure.

In subsequent descriptions, suffixes such as "module", "component", or "unit" used to represent elements are only used to facilitate the explanation of the disclosure, and have no specific meaning in themselves. Therefore, "module", "component", or "unit" can be used in combination.

The motion time calculation terminal in the embodiment of the disclosure may be a PC, or a wearable apparatus having motion mode acquiring function such as smart bracelet, a smart watch, etc.

Figure 1:
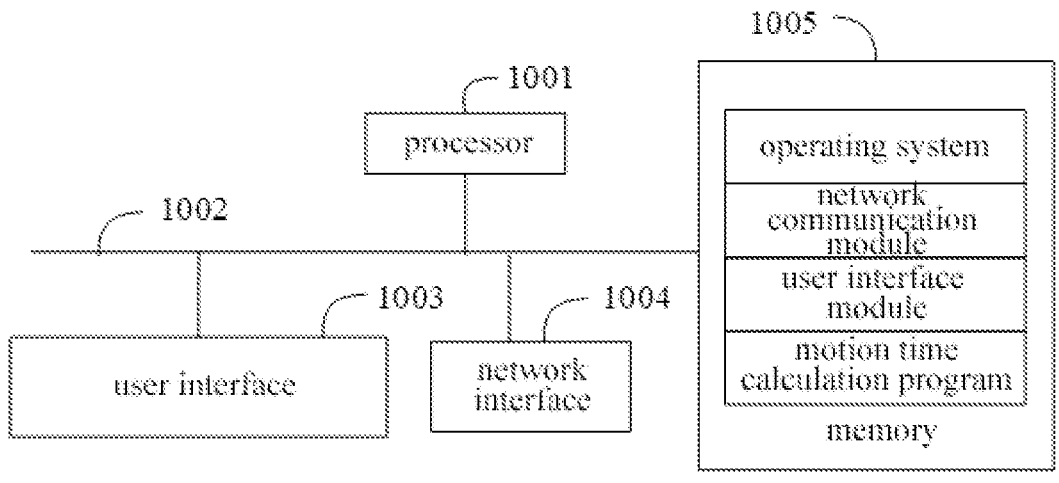
FIG. 1 is a schematic diagram of a hardware structure of an embodiment of the motion time calculation apparatus provided by an embodiment of the disclosure.

As shown in FIG. 1, the terminal may comprise: a processor 1001, such as a CPU; a network interface 1004; a user interface 1003; a memory 1005; and a communication bus 1002. Among them, the communication bus 1002 is used to realize the connection and communication between these components. The user interface 1003 may comprise a display screen (Display), an input unit such as a keyboard (Keyboard), and the optional user interface 1003 may further comprise a standard wired interface and a wireless interface. The network interface 1004 may optionally comprise a standard wired interface, and a wireless interface (for example. a WI-FI interface). The memory 1005 may be a high-speed RAM memory or a stable memory (non-volatile memory), such as disk memory. The memory 1005 may be optionally a storage device independent of the processor 1001 described in the above.

Optionally, the terminal may further comprise a camera, a RF (Radio Frequency) circuit, a sensor, an audio circuit and a Wi-Fi module, etc. Wherein, the sensor may be a light sensor, a motion sensor or other sensors. Specifically, the light sensor may comprise an ambient light sensor and a proximity sensor, wherein the ambient light sensor can adjust the brightness of the display screen according to the brightness of the ambient light, and the proximity sensor can turn off the display screen and/or the backlight when the mobile terminal is moved to the ear. As a kind of the motion sensor, a gravity acceleration sensor can detect the magnitude of acceleration in all directions (generally in three axes), and can detect the magnitude and the direction of gravity when the gravity acceleration sensor is in a static state, and can be used to identify the application of mobile terminal postures (for example, horizontal and vertical screen switching, related games, magnetometer posture calibration), and vibration identification related functions (for example, pedometer, knocking), etc. Obviously, the mobile terminal may also be configured with other sensors such as a gyroscope, a barometer, a hygrometer, a thermometer, an infrared sensor and the like, which will not be described again herein.

Those skilled in the art can understand that the terminal structure shown in FIG. 1 does not constitute a restriction to the terminal, and can comprise more or fewer components than that shown in the drawings, or some components may be combined, or may have different component arrangements.

As shown in FIG. 1, the memory 1005 as a computer-readable storage medium may comprise an operating system, a network communication module, a user interface module, and a motion time calculation program.

In the terminal as shown in FIG. 1, the network interface 1004 is mainly used to connect to a backend server and perform data communication with the backend server; the user interface 1003 is mainly used to connect to a client end (a user end) and perform data communication with the client end; the processor 1001 can be used to call the motion time calculation program stored in the memory 1005, and the operations in the motion time calculation method provided by the following embodiments are implemented when the motion time calculation program is executed by the processor.

An embodiment of the motion time calculation method of the disclosure is proposed based on the apparatus hardware structure as described in the above.

Referring to FIG. 2, in a first embodiment of the motion time calculation method of the disclosure, the motion time calculation method comprises:

Step S10, acquiring a motion flag corresponding to a first preset time period, wherein the motion flag comprises a first motion flag and a second motion flag.

This embodiment uses a three-axis accelerometer to determine the motion state and to calculate the motion time. The following motion state is explained by taking a riding state as an optimal example. It can be understood that the motion state in this embodiment is not limited to riding, and the three-axis accelerometer refers to a sensor that can measure acceleration signals on three coordinate axes, wherein one of the three coordinate axes is a gravity axis, another is a horizontal axis, the remaining is an axis in the front and rear direction. The motion flag in this embodiment refers to a flag corresponding to the riding mode or the non-riding mode in the first preset time period. It can be seen that the motion flag in this embodiment comprises the first motion flag and the second motion flag, wherein the first motion flag refers to corresponding to the riding mode in the first preset time period, and the second movement flag refers to corresponding to the non-riding mode in the first preset time period.

Step S20, if motion flags corresponding to two consecutive first preset time periods are first motion flag, entering a motion mode.

It can be seen that the first motion flag refers to a flag corresponding to the riding mode in the first preset time period. When the motion flags determined according to the three-axis accelerometer correspond to the first motion flag in the two consecutive first preset time periods, it is determined that the motion mode is entered from the first one of the first preset time period. It can be understood that the two consecutive in this embodiment is not the expression for limiting the present technical solution, but is expressed as the optimal embodiment. For example, if the first preset time period is 5 seconds, and the motion flags corresponding to the two consecutive first preset time periods are the first motion flag from 0 timing, it is determined that the user who wears the intelligent wearable device provided with the three-axis accelerometer therein is in the riding state, that is, entering the motion mode, from 0 timing.

Step S30, after entering the motion mode, if motion flags corresponding to three consecutive first preset time periods are second motion flags, exiting the motion mode.

It can be seen that the second motion flag refers to a flag corresponding to the non-motion mode in the first preset time period. When the motion flags determined according to the three-axis accelerometer correspond to the second motion flag in the three consecutive first preset time periods, it is determined that the motion mode is exited from the first one of the first preset time period among the three consecutive first preset time periods. It can be understood that the three consecutive in this embodiment is not the expression for limiting the present technical solution, but is expressed as the optimal embodiment. For example, if the first preset time period is 5 seconds, and the motion flags corresponding to the two consecutive first preset time periods are the first motion flags from 0 timing, it is determined that the motion mode is entered from 0 timing, and the motion flags corresponding to the three consecutive first preset time periods from the third one of the first preset time period are the second motion flags, thus it is determined that the user who wears the intelligent wearable device provided with a three-axis accelerometer therein is not in the riding state, that is, exiting the motion mode, from the 10th second.

Step S40, counting a time from entering the motion mode to exiting the motion mode into a motion time.

It can be seen that, taking the content of the above embodiment as an example, if the motion flags corresponding to the two consecutive first preset time periods are the first motion flags from 0 timing, thus the motion mode is entered from 0 timing, and if the motion flags corresponding to the three consecutive first preset time periods from the third one of the first preset time period are the second motion flags, the motion mode is exited from the 10th second, and the duration of the motion mode is 10 seconds, that is, the time from entering the motion mode to exiting the motion mode (the motion time in this embodiment) is 10 seconds. Specifically, the detailed steps of Step S10 comprise:

Step a1, acquiring a resultant acceleration of the first axis, the second axis and third axis by the three-axis accelerometer, and calculating resultant acceleration energy corresponding to the second preset time period and calculating the number of peaks of the resultant acceleration based on a sampling frequency and the resultant acceleration, wherein the second preset time period belongs to the first preset time period.

Figure 3:
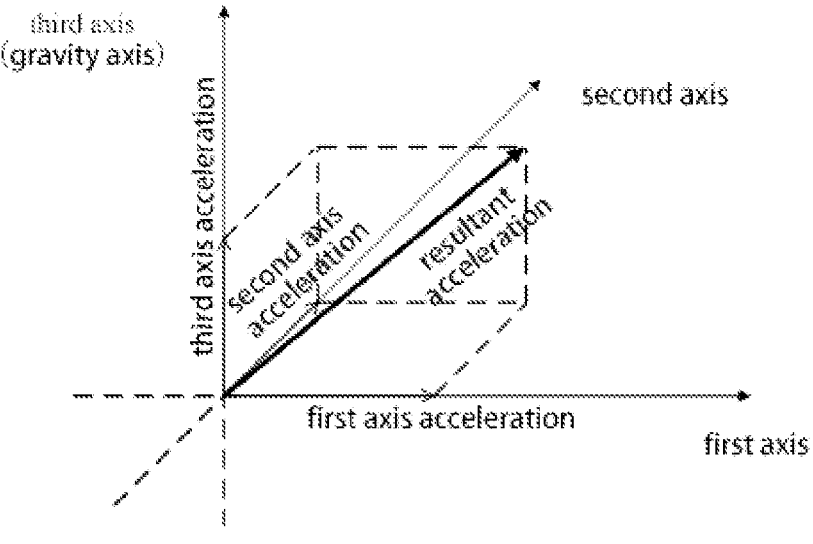
FIG. 3 is a schematic diagram of a resultant acceleration in the first embodiment of the motion time calculation method of the disclosure.

In this embodiment, the three-axis accelerometer refers to a sensor that can measure acceleration signals on three coordinate axes, wherein one of the three coordinate axes is an axis in the up and down (gravity) direction, another is an axis in the horizontal (left and right) direction, the remaining is an axis in the front and rear direction, the three axes are the first axis, the second axis and the third axis in the disclosure. It is known that the acceleration has directions and magnitude, and the resultant acceleration (comprising magnitude and direction) of the three axes can be calculated by representing the acceleration obtained by the three axes in a spatial coordinate axis, as shown in FIG. 3. The resultant acceleration of the three axes is shown as the resultant acceleration in FIG. 3. In this embodiment, the sampling frequency refers to a frequency at which the acceleration value of each axis is obtained per unit of time. If the sampling frequency is 50 per second, then it means that the three-axis accelerometer obtains fifty acceleration values per second, that is, fifty groups of acceleration values are obtained per second (three axes correspond to three acceleration values). By calculating the resultant acceleration, fifty resultant acceleration values are obtained per second, and if the second preset time period in this embodiment is one second, the method for calculating the resultant acceleration energy corresponding to the second preset time period can be as follows: the first Step: calculating the average value of fifty resultant acceleration values at first; the second Step: calculating the absolute value of the difference between each of the fifty resultant acceleration values and the average value obtained in the first Step; the third Step: calculating the sum of all the absolute values obtained in the second Step. The sum obtained in third Step is the resultant acceleration energy in this embodiment. Sorting the resultant acceleration values obtained in the second preset time period in the order in which they are obtained, and if a certain resultant acceleration value is less than its previous resultant acceleration value and less than its subsequent resultant acceleration value, thus this resultant acceleration value is a peak value of one resultant acceleration, or if a certain resultant acceleration value is greater than its previous resultant acceleration value and greater than its subsequent resultant acceleration value, then this resultant acceleration value is also a peak value of one resultant acceleration, the peak values of all the resultant acceleration values acquired in the second preset time period is counted according to this method, to obtain the number of the peaks in this embodiment, wherein the resultant acceleration energy and the number of the peaks of the resultant acceleration are a factor that determine whether the user is in the riding state within the second preset time period.

Step a2, calculating an acceleration energy ratio corresponding to the second preset time period based on the resultant acceleration energy.

Calculating the acceleration energy of the first axis, the acceleration energy of the second axis, and the acceleration energy of the third axis according to the above method for calculating the resultant acceleration energy. Specifically, if the second preset time period is one second, and the sampling frequency is 50 times per second, thus fifty acceleration values of the first axis, fifty acceleration values of the second axis, and fifty acceleration values of the third axis can be obtained per second. Taking the first axis as an example for explanation, at first, calculating the average value of fifty acceleration values. Next, calculating the absolute values of the difference between each of the fifty acceleration values and the previously calculated average value. Finally, calculating the sum of all the previously obtained absolute values. The sum obtained by this calculation is the acceleration energy of the first axis. After acquiring the acceleration energy of the three axes, the ratio of the acceleration energy of the three axes can be calculated. For example, the ratio between the acceleration energy of the first axis and the acceleration energy of the second axis is a first ratio, the ratio between the acceleration energy of the first axis and the acceleration energy of the third axis is a second ratio, the ratio between the acceleration energy of the second axis and the acceleration energy of the third axis is a third ratio, and the first ratio, the second ratio, and third ratio are acceleration energy ratios corresponding to the second preset time period in this embodiment, wherein the acceleration energy ratio is also a factor that determines whether the user is in a riding state during the second preset time period.

Step a3: if the resultant acceleration energy belongs to a first preset interval, a maximum value of the acceleration energy ratio is less than the first preset threshold, and the number of the peaks of the resultant acceleration is greater than the second preset threshold, determining motion element corresponding to the second preset time period as a first motion element.

In this embodiment, when the resultant acceleration energy, the energy ratio, and the number of peaks obtained in the above all meet the following three conditions, the motion element corresponding to the second preset time period is the first motion element, the first motion element indicates that the second preset time period is highly likely to correspond to the riding state, and the number of the first motion element corresponding to the second preset time period within the first preset time period determines whether the motion flag corresponding to the first preset time period is the first motion flag or the second motion flag, wherein the three conditions are that the resultant acceleration energy belongs to the first preset section, a maximum value of all the energy ratios is less than the first preset threshold, and the number of the peaks is greater than the second preset threshold. It can be seen that the first preset section, the first preset threshold, and the second preset threshold are obtained through a plurality of experiments based on the human motion characteristics during cycling, if the preset time period is one second and the sampling frequency is 50/second, the first preset section may be (9, 60), the first preset threshold value may be 2.2, and the peak number may be 9.

Step a4: if the number of first motion element corresponding to the first preset time period is greater than the third preset threshold, determining the motion flag corresponding to the first preset time period as the first motion flag.

It can be seen that the first motion element in this embodiment refers to a factor that tend to the riding mode. If the first preset time period contains five second preset time periods, and the third preset value is a value less than five, thus when the number of the first motion elements corresponding to all the second time periods within the first time period is greater than the third preset value, it is determined that the motion flag corresponding to the first preset time period is the first motion flag.

Specifically, the detailed steps of Step a1 comprise:

Step b1, determining a sampling time point corresponding to the second preset time period based on the sampling frequency and the second preset time period, wherein the number of sampling time points is greater than one, and the sampling time points correspond to resultant acceleration one by one.

Step b2, calculating the average value of the resultant accelerations.

Step b3, calculating the absolute difference value between each of the resultant accelerations and the average value, and taking the sum of the absolute difference values as the resultant acceleration energy.

This embodiment provides a specific application scenario. If the sampling frequency is 50/second and the second preset time period is 1 second, thus 50 sampling time points are evenly distributed within the 1 second. Acceleration values of the three axes will be collected at each of the sampling time points, and ultimately fifty groups of sampling samples containing the acceleration values of the three axes are obtained. After calculating the resultant acceleration values for these samples, fifty resultant acceleration values are obtained, thus the average value of all resultant acceleration values (that is, the average value of the resultant acceleration in this embodiment) are calculated, after obtaining absolute values of the difference values between each of the resultant acceleration values and the average value of all resultant acceleration values, these absolute values of the difference values are added to obtain the resultant acceleration energy. The resultant acceleration energy obtained in this embodiment is one of the factors that determine the motion element corresponding to the second preset time period, and the number of the motion elements determines the motion flag corresponding to the first preset time period.

Specifically, the detailed steps of Step a1 comprise:

Step c1, acquiring a target waveform graph containing all of the resultant accelerations based on all of the resultant accelerations obtained within the second preset time period, and taking the sum of the number of peaks and valleys in the target waveform graph as the number of the peaks of the resultant accelerations.

This embodiment provides a specific application scenario. If the sampling frequency is 50/second and the preset time period is 1 second, then after obtaining fifty resultant acceleration values in Step S10, acquiring these resultant acceleration values in a two-dimensional coordinate system. It can be seen that the horizontal axis of this two-dimensional coordinate system may represent time, that is, the sampling time point corresponding to each resultant acceleration value, and the vertical axis may represent the magnitude of the resultant acceleration value. After drawing the fifty resultant acceleration values in the two-dimensional coordinate system, connecting all the resultant acceleration values with a smooth curve by starting from the first resultant acceleration value, to form the waveform graph, that is, the target waveform graph in this embodiment, finally the number of peaks and valleys in the target waveform graph are counted, and taking the sum of the number of the peaks and the valleys as the number of the peak values of the resultant acceleration, and the number of the peak values obtained in this embodiment is also one of the factors that determine the motion elements corresponding to the second preset time period, and the number of motion elements determines the motion flag corresponding to the first preset time period.

Specifically, the detailed steps of Step a2 comprise:

Step d1, calculating a first acceleration energy corresponding to the first axis, a second acceleration energy corresponding to the second axis, and a third acceleration energy corresponding to the third axis within the second preset time period;

Step d2, calculating a first ratio between the first acceleration energy and the second acceleration energy, a second ratio between the first acceleration energy and the third acceleration energy and a third ratio between the second acceleration energy and the third acceleration energy, and taking the first ratio, the second ratio and the third ratio as acceleration energy ratios corresponding to the second preset time period.

In this embodiment, the first acceleration energy, the second acceleration energy, and the third acceleration energy are calculated in the same way as that of the resultant acceleration energy, that is, if the sampling frequency is 50 times per second, it means that the three-axis accelerometer obtains the acceleration values corresponding to the three axes fifty times per second, that is, fifty groups of acceleration values are obtained per second (each group contains three acceleration values). Taking the first axis as an example, after obtaining 50 acceleration values, calculating the average value of the fifty acceleration values, and then calculating the absolute values of the difference values between each of the acceleration values and the average value respectively (that is, taking absolute values for the difference values), and the sum obtained by adding all the obtained absolute difference values is the first acceleration energy corresponding to the first axis. In this embodiment, the calculation methods for the second acceleration energy and the third acceleration energy are the same as the above calculation method for the first acceleration energy, and it can be seen that after calculating the first acceleration energy, the second acceleration energy, and the third acceleration energy, it is possible to further calculate the ratio between the first acceleration energy and the second acceleration energy (i.e., the first ratio in this embodiment), the ratio between the first acceleration energy and the third acceleration energy (i.e., the second ratio in this embodiment), the ratio between the second acceleration energy and the third acceleration energy (i.e., the third ratio in this embodiment), the first ratio, the second ratio and the third ratio are the acceleration energy ratios. The acceleration energy ratios obtained in this embodiment is also one of the factors that determine the motion elements corresponding to the second preset time period, and the number of motion elements determines the motion flag corresponding to the first preset time period.

Specifically, the steps after Step a3 comprise:

Step e1: If the number of first motion elements corresponding to the first preset time period is less than or equal to the third preset threshold, determining the motion flag corresponding to the first preset time period as the second motion flag.

Specifically, the detailed steps of Step S40 comprise:

Step f1, acquiring the number of a target of the first preset time period from entering the motion mode to exiting the motion mode, and taking a product of the number of the target and the first preset time period as the motion time.

It can be seen that if the second preset time period is 1 second, and the first preset time period is 5 seconds, and in the case of ignoring the time of acquiring data and calculating data, determining the motion mode is started at 0 timing, and determining the time period is performed from 0 to 10 seconds. If the determination result is the motion mode, determining the time period is performed from 10 to 25 seconds. If the determination result is exit the motion mode, it indicates that the time point of entering the motion mode is 0 timing, and the time point of exiting the motion mode is 10 seconds, and the number of the first preset time periods from entering the motion mode to exiting the motion mode is two, and the product of the number of the target and the first preset time period is 10 seconds, and if the motion mode is riding mode, then the riding time is 10 seconds.

In this embodiment, the motion flag corresponding to the first preset time period is acquired by a three-axis accelerometer, wherein the motion flag comprises a first motion flag and a second motion flag, so that motion flags corresponding to consecutive first preset time periods can be determined If the motion flags corresponding to two consecutive first preset time periods are first motion flags, the motion mode is entered. After entering the motion mode, if the motion flags corresponding to three consecutive first preset time periods are second motion flags, the motion mode is exited, and a time from entering the motion mode to exiting the motion mode is counted into a motion time, to ultimately achieve a more accurate calculation of the motion time.

Figure 4:
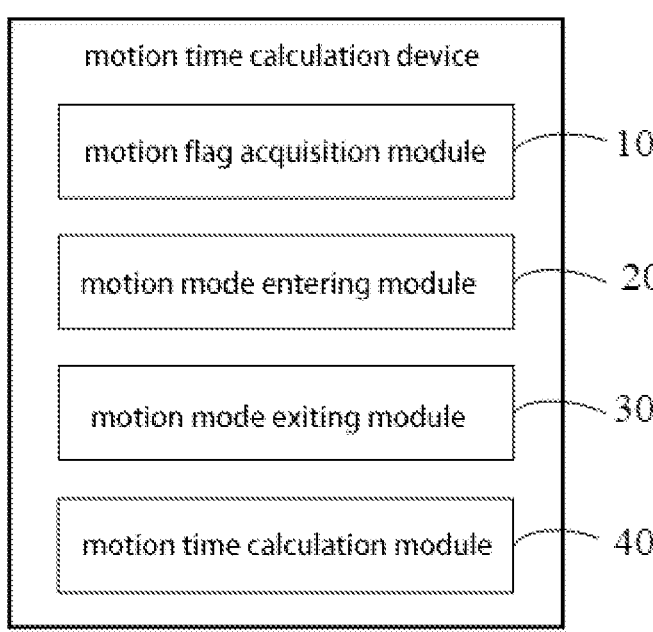
FIG. 4 is a schematic diagram of a functional module of an embodiment of the motion time calculation device of the disclosure.

In addition, referring to FIG. 4, the embodiment of the disclosure also proposes a motion time calculation device, the motion time calculation device comprises:

a motion flag acquisition module 10, for acquiring a motion flag corresponding to a first preset time period, wherein the motion flag comprises a first motion flag and a second motion flag;

a motion mode entering module 20, for entering a motion mode if motion flags corresponding to two consecutive first preset time periods are first motion flags;

a motion mode exiting module 30, for exiting the motion mode if motion flags corresponding to three consecutive first preset time periods are second motion flags after entering the motion mode; and a motion time calculation module 40, for counting a time from entering the motion mode to exiting the motion mode into a motion time.

Optionally, the motion flag acquisition module 10 comprises:

a peak number calculation unit, for acquiring a resultant acceleration of the first axis, the second axis and third axis by the three-axis accelerometer, and calculating resultant acceleration energy corresponding to a second preset time period and calculating the number of peaks of the resultant acceleration based on the sampling frequency and the resultant acceleration, wherein the second preset time period belongs to the first preset time period;

an acceleration energy ratio calculation unit, for calculating an acceleration energy ratio corresponding to the second preset time period based on the resultant acceleration energy;

a motion element determination unit for determining a motion element corresponding to the second preset time period as a first motion element if the resultant acceleration energy belongs to a first preset section, a maximum value of the acceleration energy ratio is less than the first preset threshold, and the number of the peaks of the resultant acceleration is greater than the second preset threshold; and a motion flag determination unit for determining a motion flag corresponding to the first preset time period as the first motion flag if the number of first motion element corresponding to the first preset time period is greater than a third preset threshold value.

Optionally, the peak number calculation unit comprises:

a sampling time point determination unit for determining a sampling time point corresponding to the second preset time period based on the sampling frequency and the second preset time period, wherein the number of sampling time points is greater than one, and the sampling time points correspond to resultant acceleration one by one;

an average value calculation unit, for calculating the average value of the resultant accelerations; and an absolute difference value calculation unit for calculating an absolute difference value between each of the resultant accelerations and the average value, and taking the sum of the absolute difference values as the resultant acceleration energy.

Optionally, the peak number calculation unit further comprises:

a target waveform acquisition unit for acquiring a target waveform graph containing all of the resultant accelerations based on all of the resultant accelerations acquired within the second preset time period, and taking a sum of the number of peaks and valleys in the target waveform graph as the number of the peaks of the resultant acceleration.

Optionally, the acceleration energy ratio calculation unit comprises:

an acceleration energy calculation unit for calculating a first acceleration energy corresponding to the first axis, a second acceleration energy corresponding to the second axis, and a third acceleration energy corresponding to the third axis in the second preset time period;

a ratio calculation unit for calculating a first ratio between the first acceleration energy and the second acceleration energy, a second ratio between the first acceleration energy and the third acceleration energy and a third ratio between the second acceleration energy and the third acceleration energy, and taking the first ratio, the second ratio, and the third ratio as acceleration energy ratios corresponding to the second preset time period.

Optionally, the motion time calculation device further comprises:

a second motion flag determination module for determining the motion flag corresponding to the first preset time period as the second motion flag if the number of the first motion element corresponding to the first preset time period is less than or equal to the third preset threshold value.

Optionally, the motion time calculation module 40 comprises:

a motion time calculation unit, for acquiring the number of a target of the first preset time period from entering the motion mode to exiting the motion mode, and taking a product of the number of the target and the first preset time period as the motion time.

The methods executed by the above program modules can be referred to various embodiments of the method of the disclosure, and will not be described herein.

It should be noted that in the descriptions, relational terms such as the first and second are only used to distinguish one entity/operation/object from another entity/operation/object, and do not necessarily require or imply any such actual relationship or order between these entities/operations/objects; The terms "comprise", "contain", or any other variation thereof are intended to cover non-exclusive inclusion, such that a process, method, object, or system that comprises a series of elements comprises not only those elements, but also other elements that are not explicitly listed, or also those inherent in such a process, method, object, or system. Without further restrictions, the element defined by the statement "comprising a . . . " does not preclude the existence of another identical element in the process, method, object, or system that comprises that element.

For device embodiments, since they are substantially similar to method embodiments, the description thereof is relatively simple. The relevant portions can be referred to the partial description of method embodiments. The device embodiments described above are only illustrative, and the units described as separate components may or may not be physically separated units. Some or all of the modules can be selected according to actual needs to achieve the purpose of the technical solutions of the disclosure. Those skilled in the art can understand and implement them without inventiveness labor.

The above serial number of embodiments in the disclosure is only for description and does not represent the advantages and disadvantages of the embodiments.

Through the description of the above embodiment, those skilled in the art can clearly understand that the above embodiment method can be implemented by means of software and necessary general hardware platforms, and of course, can also be implemented by means of hardware, however in many cases the former is a better implementation. Based on this understanding, the substantial technical solution or the portion that contributes to the prior art in the disclosure can be embodied in the form of a software product stored in a storage medium (such as ROM/RAM, magnetic disk, and optical disk) as described above, comprising several instructions to enable a terminal apparatus (which may be a mobile phone, computer, server, air conditioner, or network apparatus, etc.) to execute the motion time calculation method described in various embodiments of the disclosure.

The above are only preferred embodiments of the disclosure, and are not intended to limit the patent scope of the disclosure. Any equivalent structure or equivalent process transformation made using the description and accompanying drawings of the disclosure, or direct or indirect application in other related technical fields, are equally comprised in the scope of patent protection of the disclosure.

What is claimed is:

1. A motion time calculation method comprising the following steps:

acquiring a motion flag corresponding to a first preset time period, wherein the motion flag comprises a first motion flag and a second motion flag;

if motion flags corresponding to two consecutive first preset time periods are first motion flags, entering a motion mode;

after entering the motion mode, if motion flags corresponding to three consecutive first preset time periods are second motion flags, exiting the motion mode; and counting a time from entering the motion mode to exiting the motion mode into a motion time.

2. The motion time calculation method according to claim 1, wherein the step of acquiring a motion flag corresponding to a first preset time period, wherein the motion flag comprises a first motion flag and a second motion flag, comprises:

acquiring a resultant acceleration of a first axis, a second axis and a third axis by a three-axis accelerometer, and calculating resultant acceleration energy corresponding to a second preset time period and calculating the number of peaks of the resultant acceleration based on a sampling frequency and the resultant acceleration, wherein the second preset time period belongs to the first preset time period;

calculating an acceleration energy ratio corresponding to the second preset time period based on the resultant acceleration energy;

if the resultant acceleration energy belongs to a first preset section, a maximum value of the acceleration energy ratio is less than a first preset threshold, and the number of the peaks of the resultant acceleration is greater than a second preset threshold, determining a motion element corresponding to the second preset time period as a first motion element; and if the number of the first motion element corresponding to the first preset time period is greater than a third preset threshold, determining the motion flag corresponding to the first preset time period as the first motion flag.

3. The motion time calculation method according to claim 2, wherein the step of calculating resultant acceleration energy corresponding to a second preset time period based on a sampling frequency and the resultant acceleration comprises:

determining a sampling time point corresponding to the second preset time period based on the sampling frequency and the second preset time period, wherein the number of sampling time points is greater than one, and the sampling time points correspond to resultant accelerations one by one;

calculating an average value of the resultant accelerations; and calculating an absolute difference value between each of the resultant accelerations and the average value, and taking a sum of absolute difference values as the resultant acceleration energy.

4. The motion time calculation method according to claim 2, wherein the step of calculating the number of peaks of the resultant acceleration comprises:

acquiring a target waveform graph containing all of the resultant accelerations based on all of the resultant accelerations acquired in the second preset time period, and taking a sum of the number of peaks and valleys in the target waveform graph as the number of the peaks of the resultant accelerations.

5. The motion time calculation method according to claim 2, wherein the step of calculating an acceleration energy ratio corresponding to the second preset time period based on the resultant acceleration energy comprises:

calculating a first acceleration energy corresponding to the first axis, a second acceleration energy corresponding to the second axis and a third acceleration energy corresponding to the third axis in the second preset time period;

calculating a first ratio between the first acceleration energy and the second acceleration energy, a second ratio between the first acceleration energy and the third acceleration energy and a third ratio between the second acceleration energy and the third acceleration energy, and taking the first ratio, the second ratio and the third ratio as acceleration energy ratios corresponding to the second preset time period.

6. The motion time calculation method according to claim 2, wherein after the step of if the resultant acceleration energy belongs to a first preset section, a maximum value of the acceleration energy ratio is less than a first preset threshold, and the number of the peaks of the resultant acceleration is greater than a second preset threshold, determining a motion element corresponding to the second preset time period as a first motion element, the method further comprises:

if the number of the first motion element corresponding to the first preset time period is less than or equal to the third preset threshold, determining the motion flag corresponding to the first preset time period as the second motion flag.

7. The motion time calculation method according to claim 1, wherein the step of counting a time from entering the motion mode to exiting the motion mode into a motion time comprises:

acquiring the number of a target of the first preset time period from entering the motion mode to exiting the motion mode, and taking a product of the number of the target and the first preset time period as the motion time.

8. A motion time calculation device, wherein the motion time calculation device comprises:

a motion flag acquisition module, configured to acquire a motion flag corresponding to a first preset time period, wherein the motion flag comprises a first motion flag and a second motion flag;

a motion mode entering module, configured to drive the device to enter a motion mode if motion flags corresponding to two consecutive first preset time periods are first motion flags;

a motion mode exiting module, configured to drive the device to exit the motion mode if motion flags corresponding to three consecutive first preset time periods are second motion flags after entering the motion mode; and a motion time calculation module, configured to count a time from entering the motion mode to exiting the motion mode into a motion time.

9. A motion time calculation apparatus, wherein the motion time calculation apparatus comprises a memory, a processor, and a motion time calculation program stored in the memory and executable by the processor, and steps of the motion time calculation method according to claim 1 are implemented when the motion time calculation program is executed by the processor.

10. A computer-readable storage medium, wherein a motion time calculation program is stored in the computer-readable storage medium, and steps of the motion time calculation method according to claim 1 are implemented when the motion time calculation program is executed by the processor.

\* \* \* \* \*